US012712704B2

(12) United States Patent
Yu et al.

(10) Patent No.: US 12,712,704 B2
(45) Date of Patent: Aug. 18, 2026

(54) CHARACTERIZATION OF COMMUNICATION LINKS

(71) Applicant: Apple Inc., Cupertino, CA (US)

(72) Inventors: Qian Yu, Santa Clara, CA (US); Dhaval H. Shah, Newark, CA (US); Himanshu Kaul, Portland, OR (US); José A Tierno, Menlo Park, CA (US); Kun Jing J. Lee, Fremont, CA (US); Sanjeev K. Maheshwari, Fremont, CA (US); Vishal Varma, Fremont, CA (US); William D Schwarz, Austin, TX (US); Xiaodan Hu, Cypress, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/808,932

(22) Filed: Aug. 19, 2024

(65) Prior Publication Data

US 2026/0052003 A1 Feb. 19, 2026

(51) Int. Cl.
*H04L 7/00* (2006.01)
*H04L 25/03* (2006.01)

(52) U.S. Cl.
CPC .......... *H04L 7/0079* (2013.01); *H04L 7/0016* (2013.01); *H04L 25/03057* (2013.01)

(58) Field of Classification Search
CPC ... H03L 7/0807; H04L 7/0016; H04L 7/0058; H04L 7/0062; H04L 7/0079; H04L 25/026; H04L 25/0264; H04L 25/03006; H04L 25/03019; H04L 25/03057; H04L 25/03254; H04L 25/03267; H04L 25/03273; H04L 27/2271; H04L 27/2275
USPC .............. 375/219, 220, 232, 233, 257, 326; 708/322, 323
See application file for complete search history.

(56) References Cited

U.S. PATENT DOCUMENTS

| | | | |
|---|---|---|---|
| 6,453,433 B1 | 9/2002 | Vollrath | |
| 7,327,610 B2 | 2/2008 | Choi et al. | |
| 8,570,881 B2 | 10/2013 | Talbot et al. | |
| 9,177,087 B1 | 11/2015 | Shimanouchi et al. | |
| 10,491,365 B1 * | 11/2019 | Lin | H04L 43/028 |
| 11,106,799 B2 | 8/2021 | Keromytis et al. | |

(Continued)

FOREIGN PATENT DOCUMENTS

| | | |
|---|---|---|
| CN | 101325461 B | 4/2011 |
| CN | 111800333 B | 12/2021 |

(Continued)

*Primary Examiner* — Young T. Tse
(74) *Attorney, Agent, or Firm* — DICKINSON WRIGHT RLLP

(57) ABSTRACT

A receiver circuit capable of characterizing a communication channel or link is disclosed. The receiver circuit may receive an input signal that encodes multiple data symbols, and may sample the input signal to generate recovered symbols, a recovered clock signal, and samples. Using the samples and recovered symbols, the receiver circuit may generate recovered data. The receiver circuit may, in response to a detection of a particular logic value in the recovered data, count a number of occurrences of a particular logic value in the samples over a range of sample threshold values and sample times to generate a conditional probability distribution of the input signal. Using a statistical measurement of the conditional probability distribution, the receiver circuit may adjust one of its operating parameters.

19 Claims, 10 Drawing Sheets

(56) References Cited

U.S. PATENT DOCUMENTS

| | | | | |
|---|---|---|---|---|
| 11,741,030 | B2 | 8/2023 | Safranek et al. | |
| 11,757,681 | B1 * | 9/2023 | Tierno | H04L 25/03885 375/232 |
| 2005/0271169 | A1 * | 12/2005 | Momtaz | H04L 7/033 375/345 |
| 2012/0257652 | A1 * | 10/2012 | Malipatil | H04L 25/03057 375/233 |
| 2013/0148712 | A1 * | 6/2013 | Malipatil | H04L 7/033 375/233 |
| 2018/0248723 | A1 * | 8/2018 | Palmer | H04L 25/03273 |
| 2024/0097875 | A1 * | 3/2024 | Bartling | H04L 7/02 |

FOREIGN PATENT DOCUMENTS

| | | | |
|---|---|---|---|
| CN | 112579479 | B | 7/2022 |
| JP | 2010146675 | A | 7/2010 |

* cited by examiner

CHARACTERIZATION OF COMMUNICATION LINKS

FIELD

The described embodiments relate generally to high-speed communication interface design and, more particularly, to techniques for characterizing a response of a communication channel.

BACKGROUND

Computing systems typically include a number of interconnected integrated circuits. In some cases, the integrated circuits may communicate using communication channels or links to transmit and receive data symbols or bits. The communication channels may support parallel communication, in which multiple data bits are transmitted in parallel, or serial communication in which data bits are transmitted one bit at a time in a serial fashion.

During transmission of data, the physical characteristics of the communication channel may attenuate a transmitted signal associated with a particular data symbol. For example, the impedance of wiring included in the communication channel or link may attenuate certain frequency ranges of the transmitted signal. Additionally, impedance mismatches between wiring included in the communication channel may induce reflections of the transmitted signal, which may degrade subsequently transmitted signals corresponding to other data bits.

DETAILED DESCRIPTION

Figure 1:
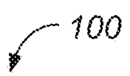
FIG. 1 is a block diagram depicting an embodiment of a receiver circuit for a computer system.
Figure 1:
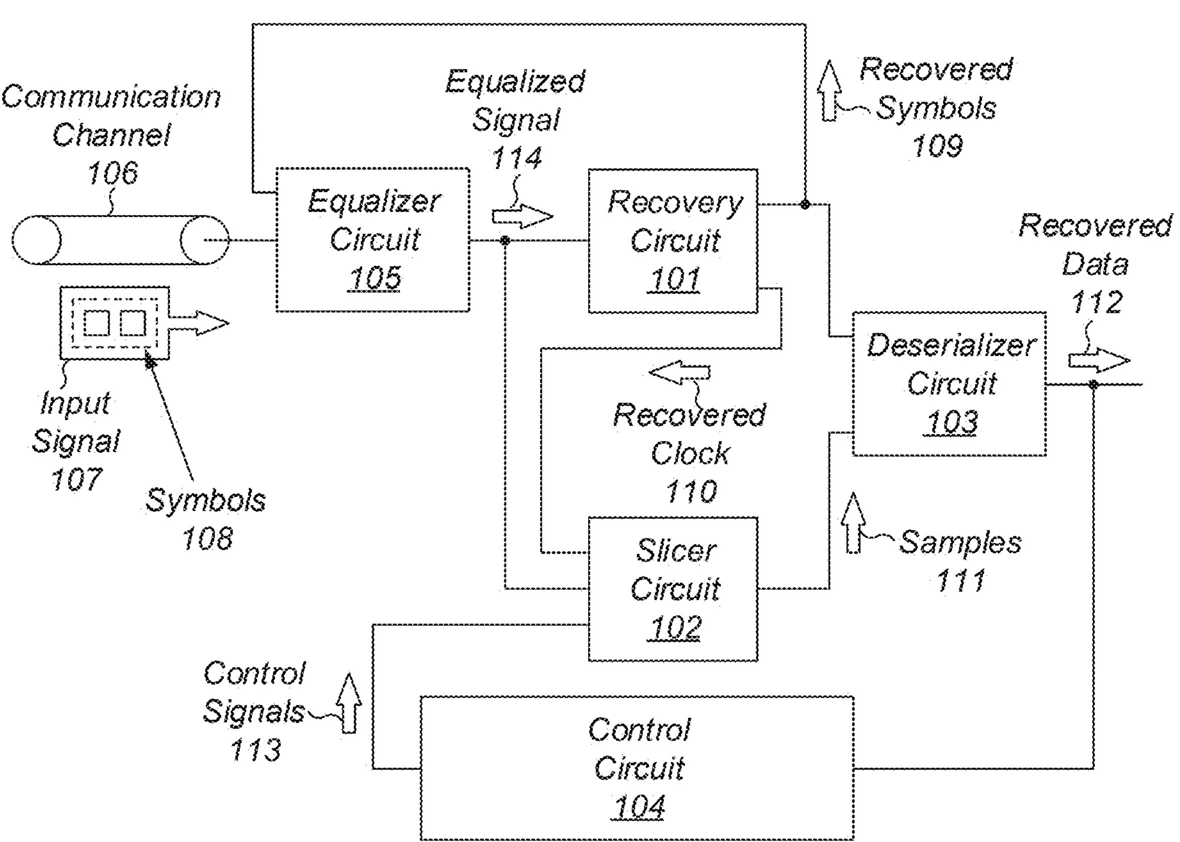

Computer systems may include multiple circuit blocks configured to send and receive data via signals propagating on communication links or channels, which can employ different communication protocols. For example, two circuit blocks may transmit data to each other in a serial fashion using seralizer/de-serializer (SERDES) circuits.

In various computer systems, the wires or conductors of a communication link are fabricated on a circuit board or other suitable substrate. Such wires or conductors can be manufactured through a deposition or other suitable process.

Variations during the manufacturing process can affect the impedance of the wires or conductors. For example, the physical dimensions of a particular wire or conductor can vary along the length of the wire changing the impedance of the wire. In cases where a multi-layer circuit board or substrate is employed, variation in the vias that connect one layer to another can also affect the electrical characteristics of the wires or conductors.

Differences in the impedance of the wires or conductors can change how signals propagate, which can limit the bandwidth for data transmission. As such, it is important to be able to test the electrical characteristics of the wires or conductors. Once a computer system, or a sub-system within the computer system, has been assembled, however, it is difficult to test the electrical characteristics of the wire or conductors of a communication link without dismantling what has already been assembled. Such disassembly is costly and renders the computer system no longer useable.

The embodiments illustrated in the drawings and described below provide techniques for characterizing a communication link or channel. By determining a single-bit response of the communication link or channel, the step response or frequency response to the communication link or channel can be determined in a non-destructive fashion. Characterizing a communication link or channel in this fashion can be used in both post-manufacture testing, as well as with testing and adaptation of a receiver circuit in the field.

A block diagram of a receiver circuit is depicted in FIG. 1. As illustrated, receiver circuit 100 includes recovery circuit 101, slicer circuit 102, deserializer circuit 103, control circuit 104, and equalizer circuit 105. It is noted that, in some embodiments, equalizer circuit 105 may be omitted, in which case recovery circuit 101 and slicer circuit 102 may use input signal 107 directly instead of equalized signal 114.

Equalizer circuit 105 is configured to generate equalized signal 114 using recovered symbols 109 and input signal 107. In various embodiments, equalizer circuit 105 may be configured to use decision-feedback equalization. Alternatively, or additionally, equalizer circuit 105 may employ continuous time linear equalization (CTLE) to attenuate low-frequency components in input signal 107, and filter high-frequency components of input signal 107.

Recovery circuit 101 is coupled to communication channel 106, and is configured to generate recovered symbols 109 and recovered clock 110 using equalized signal 114. It is noted that input signal 107 encodes symbols 108, which can corresponding to individual bits of data or multiple bits of data. Recovered symbols 109 may correspond to symbols 108, and may, in different embodiments, include individual bits of data, or words of data that include multiple bits depending on how symbols 108 are encoded.

Slicer circuit 102 is configured to generate samples 111 using equalized signal 114 and recovered clock 110. As described below, slicer circuit 102 may change a value of a reference voltage and/or a timing at which samples are taken based on control signals 113.

Deserializer circuit 103 is configured to generate data 112 using recovered symbols 109 and samples 111. In various embodiments, deserializer circuit 103 is configured to collect a predetermined number of recovered symbols 109 and samples 111, and then form a data word using the collected symbols and samples. In some embodiments, data words 112 may be transmitted to consumer circuit blocks at a lower frequency than recovered symbols 109.

Control circuit 104 is configured to determine, in response to a determination that a particular pattern has occurred in recovered data 112, a conditional probability distribution of equalized signal 114 using samples 111. Additionally control circuit 104 is configured to adjust or adapt at least one operating parameter of equalizer circuit 105 based on a statistical measurement of the conditional probability distribution of the equalized signal 114. In various embodiments, to adjust the at least one operating parameter, control circuit 104 is further configured to determine a statistical mean of the conditional probability distribution, and adjust the at least one operating parameter using the statistical mean. It is noted that in cases where equalization is not performed, control circuit 104 is configured, in response to the determination that the particular pattern has occurred in recovered data 112, a conditional probability distribution of input signal 107.

To determine the conditional probability distribution, control circuit 104 may be further configured to count the number of occurrences of a particular logic value samples 111 over a total number of samples 111 collected in recovered data 112. In various embodiments, the particular logic value may be a logical-1 value.

Once the number of the particular logic value over the total number of bits has been determined, control circuit 104 is further configured to determine a conditional bit-one ratio ("CBOR"). To determine the CBOR, control circuit 104 is configured to count the number of the particular logic value, i.e., logical-1, in response to a detection of a conditioning event. In various embodiments, the conditioning event corresponds to a particular symbol pattern in recovered data 109. For example, for non-return to zero ("NRZ") modulation, the data symbol set is {0, 1}. The conditioning event can be the detection of 2 consecutive bits "01."

To determine the conditional probability distribution, control circuit 104 is configured to measure the variance of the CBOR with respect to changes in threshold or reference voltage of slicer circuit 102. In various embodiments, control circuit 104 is configured to generate control signals 113 such that the threshold or reference voltage of slicer circuit 102 is swept over a range of values using a given timing value based on recovered clock 110. In other embodiments, control circuit 104 may be configured to generate control signals 113 such that the sample point is swept through multiple values that span a data eye of input signal 107. It is noted that in some embodiments, both the threshold sweep and the sample point sweep may be employed together.

To determine the statistical mean, control circuit 104 may be configured to sweep the threshold of slicer circuit 102 from $-V_0$ to $V_0$ in a step size of $$\frac{2V_0}{N},$$

where N is a positive integer. It is noted that it is assumed that input signal 107 has a dynamic range within the range of threshold values.

At each of the N+1 threshold values, control circuit 104 is configured to determine the CBOR of recovered data 109. In various embodiments, control circuit 104 is further configured to save the CBOR values in an array R[n], for n=0, 1, . . . , N. Control circuit 104 may also be configured to generate a histogram with N bins, where the frequency of the $n_{th}$ bin is R[n]−R[n−1]. Control circuit 104 may be further configured to determine a weighted average of the bin centers to generate the statistical mean.

In various embodiments, control circuit 104 may be implemented using a processor circuit, a microcontroller circuit, or any other suitable combination of combinatorial and sequential logic circuits. In cases where control circuit 104 is implemented using a processor circuit, software or program instructions for the processor circuit may be stored in a memory circuit (not show).

Figure 2:
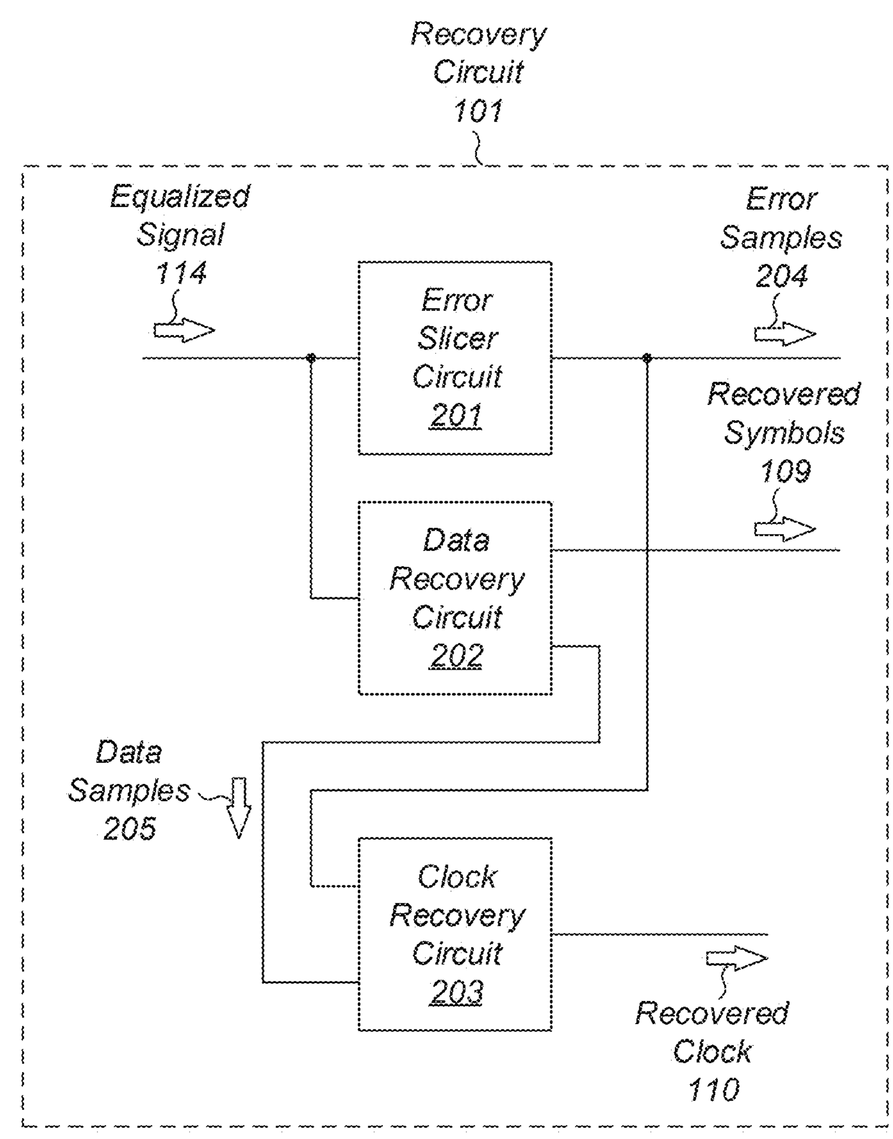
FIG. 2 is a block diagram depicting an embodiment of a recovery circuit for a receiver circuit.

Turning to FIG. 2, a block diagram of an embodiment of recovery circuit 101 is depicted. As illustrated, recovery circuit 101 includes error slicer circuit 201, data recovery circuit 202, and clock recovery circuit 201.

Error slicer circuit 201 is configured to generate error samples 204 using equalized signal 114. In various embodiments, error slicer circuit 201 may be configured to sample equalized signal 114 using one or more error threshold voltages to generate error samples 204. In some embodiments, error slicer circuit 201 may be implemented using one or more comparator circuits coupled to corresponding latch circuit or flip-flop circuits.

Data recovery circuit 202 is configured to generate data samples 205 and recovered data 109 using equalized signals 114. In some embodiments, data recovery circuit 202 may be configured to generate data samples 205 to generate recovered symbols 109. Data recovery circuit 202 may, in some embodiments, be configured to sample equalized signal 114 using recovered clock 110 as a time reference. In some cases, data recovery circuit 202 may employ some back-end processing to select different ones of data samples 205 in order to determine a value for a given portion of recovered symbols 109. In various embodiments, data recovery circuit 202 may be implemented using one or more comparator circuits coupled to corresponding latch circuits or flip-flop circuits, and a state machine or other sequential logic circuits. In other embodiments, data recovery circuit 202 may be implemented using one or more analog-to-digital converter circuits.

Clock recovery circuit 203 is configured to generate recovered clock 110 using error samples 204 and data samples 205. In some embodiments, to generate recovered clock 110, clock recovery circuit 203 may be configured to adjust the phase and/or frequency of a periodic signal so that transitions in the periodic signal align to transitions in data samples 205. Various well-known techniques for aligning the transitions may be employed. In various embodiments, clock recovery circuit 203 may be implemented using a phase-locked loop circuit, or any other suitable circuit configured to adjust the phase and/or frequency of a periodic signal.

Figure 3:
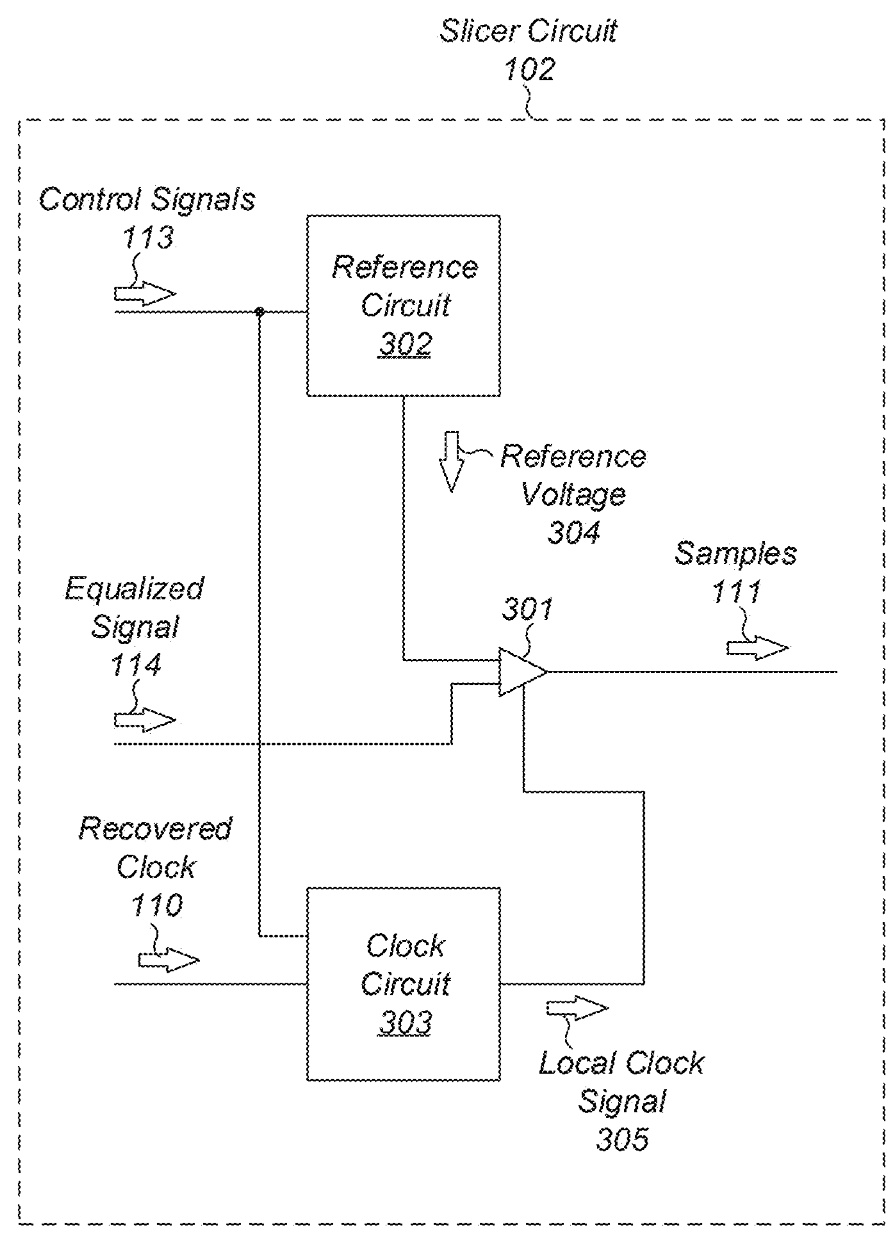
FIG. 3 is a block diagram depicting an embodiment of a slicer circuit for a receiver circuit.

Turning to FIG. 3, a block diagram of slicer circuit 102 is depicted. As illustrated, slicer circuit 102 includes comparator circuit 301, reference circuit 302, and clock circuit 303.

Comparator circuit 301 is configured to generate samples 111 using reference voltage 304, equalized signal 114, and local clock signal 305. To generate samples 111, comparator circuit 301 may be configured to perform a comparison of equalized signal 114 to reference voltage 304, and sample a result of the comparison in response to an activation of local clock signal 305. It is noted that although comparator circuit 301 is depicted as using equalized signal 114, in other embodiments, comparator circuit 301 may use input signal 107 directly without any equalization.

In various embodiments, comparator circuit 301 may be implemented using a differential amplifier circuit, a sample-and-hold circuit, a Schmitt trigger circuit, or any other suitable circuit configured to compare two voltage levels and generate either an analog or digital output value based on a difference between the two voltage levels.

Reference circuit 302 is configured to generate reference voltage 304. In various embodiments, reference circuit 302 is further configured to change a value of reference voltage 304 using control signals 113. By changing the value of reference voltage 304, slicer circuit 102 can sample equalized signal 114 using multiple threshold (or reference) voltages to generate the data used to determine the conditional probability distribution.

In various embodiments, reference circuit 302 may be implemented using a voltage regulator circuit, e.g., a low-dropout regulator circuit, configured to generate reference voltage 304 using a voltage level of a power supply node. In other embodiments, reference circuit 302 may be implemented using analog multiplex circuits configured to select, based on control signals 113, one of multiple reference voltages generated in a different circuit block.

Clock circuit 303 is configured to generate local clock signal 305 using recovered clock 110 and control signals 113. In various embodiments, clock circuit 303 is configured to adjust local clock signal 305 based on control signals 113 in order to allow reference circuit 100 to scan through different time points in order to obtain the data to determine the conditional probability distribution. In various embodiments, clock circuit 303 may be implemented using multiple delay circuits, phase or delay comparator circuits, or any other suitable clock generation circuits.

Although a single comparator circuit is depicted in the embodiment of FIG. 3, in other embodiments, multiple comparator circuits may be employed, each comparing equalized signal 114 to a different reference voltage value. Alternatively, or additionally, multiple comparator circuits may be employed with each sampling a result of the comparison of reference voltage 304 and equalized signal 114 and input signal 107 at different time points centered around a rising or falling edge of local clock signal 305.

Figure 4:
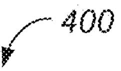
FIG. 4 is a block diagram depicting an embodiment of a computer system that includes a transmitter circuit and a receiver circuit.
Figure 4:
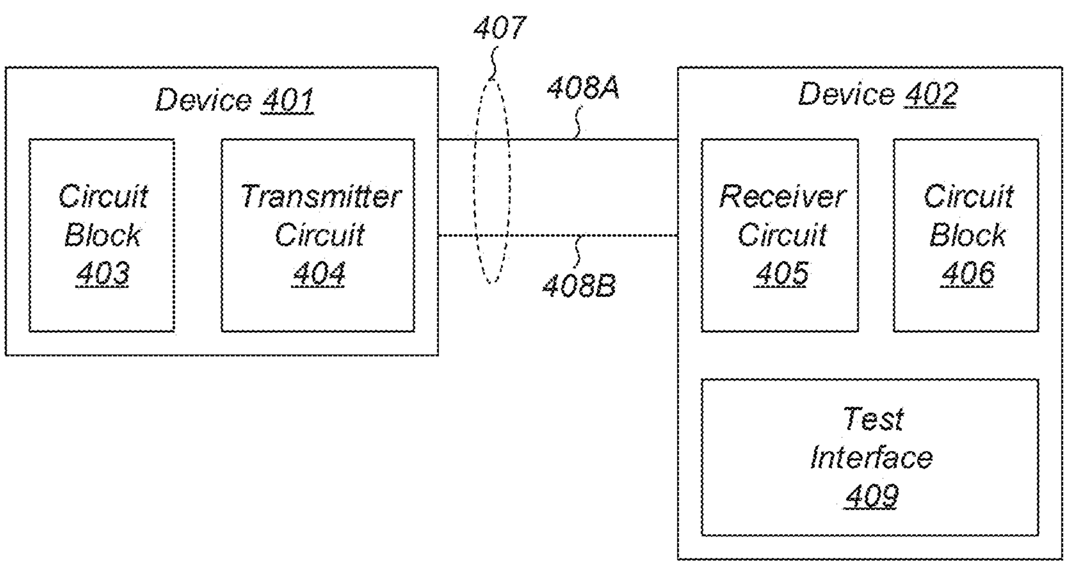

As described above, a receiver circuit, such as receiver circuit 100, may be employed in a computer system that includes multiple devices coupled to a communication channel or link. A block diagram of an embodiment of such a computer system is depicted in FIG. 4. As illustrated, computer system 400 includes devices 401 and 402, coupled by communication bus 407.

Device 401 includes circuit block 403 and transmitter circuit 404. In various embodiments, device 401 may be a processor circuit, a processor core, a memory circuit, or any other suitable circuit block that may be included on an integrated circuit in a computer system. It is noted that although device 401 only depicts a single circuit block and a single transmitter circuit, in other embodiments, additional circuit blocks and additional transmitter circuits may be employed.

Transmitter circuit 404 is configured to serially transmit signals, via communication bus 407, corresponding to data received from circuit block 403. Such signals may differentially encode one or more bits or symbols such that a difference between the respective voltage levels of wires 408A and 408B, at a particular point in time, corresponding to a particular bit or symbol value. In some cases, the generation of the signals may include encoding the bits prior to transmission. It is noted that although communication bus 407 is depicted as including two wires, in other embodiments, any suitable number of wires may be employed.

Device 402 includes receiver circuit 405, circuit block 406, and test interface 409. Like device 401, device 402 may be a processor circuit, a processor core, a memory circuit, or any other suitable circuit block configured to receive data from transmitter circuit 404. In various embodiments, receiver circuit 405 may correspond to receiver circuit 100 as depicted in FIG. 1.

Test interface 409 may be configured to transmit results of a characterization of communication bus 407 to a tester or other suitable test device external to computer system 400. As described above, the results of the characterization of communication bus 407 may include a single-bit response, a conditional bit-one ratio or probability distribution, or one or more statistical parameters derived from the conditional bit-one ratio or probability distribution.

Devices 401 and 402 may, in some embodiments, be fabricated on a common integrated circuit. In other embodiments, devices 401 and 402 may be located on different integrated circuits mounted on a common substrate or circuit board. In such cases, communication bus 407 may include metal or other conductive traces on the substrate or circuit boards. Although only two devices are depicted in computer system 400, in other embodiments, any suitable number of devices may be employed.

To summarize, various embodiments of a receiver circuit for a computer system are disclosed. Broadly speaking, a receiver circuit includes an equalizer circuit that may be configured to receive an input signal via a communication channel and generate an equalized signal using a plurality of recovered symbols and the input signal. The receiver circuit can also include a recovery circuit that may be configured to generate the plurality of recovered symbols and a recovered clock signal using the equalized signal. The receiver circuit may also include a slicer circuit that may be configured to generate a plurality of samples using the equalized signal, and a deserializer circuit that may be configured to generate recovered data using the plurality of recovered symbols and the plurality of samples. The receiver circuit may also include a control circuit that may be configured to count a number of occurrences of a particular logic value in the plurality of samples in response to a detection of a particular pattern in the plurality of recovered symbols. The control circuit may be further configured to determine, using the number of occurrences of the particular logic value, a conditional probability distribution of the equalized signal, and adjust at least one operating parameter of the equalizer circuit based on a statistical measurement of the conditional probability distribution of the equalized signal.

Figure 5:
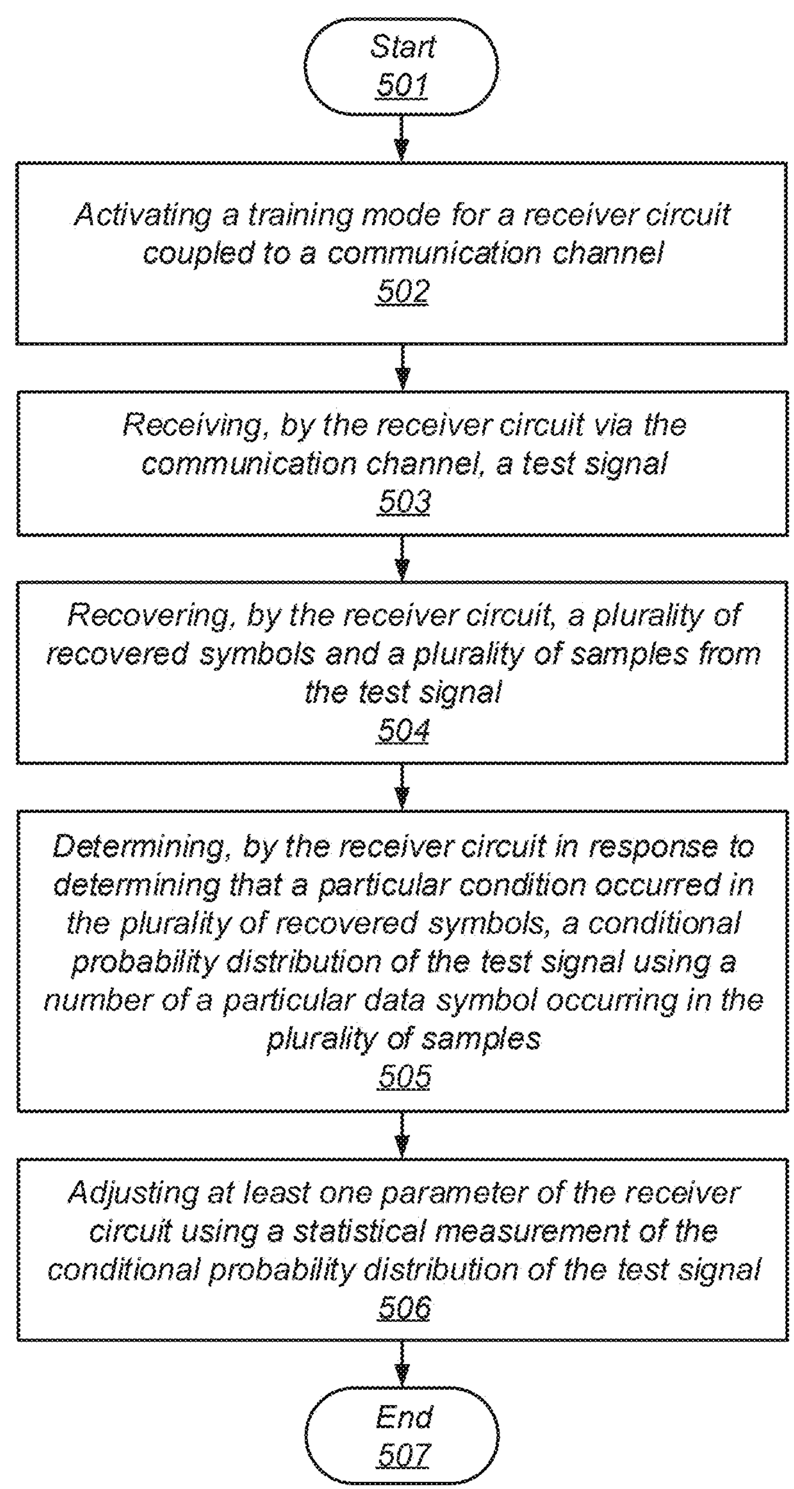
FIG. 5 is a flow diagram depicting an embodiment of a method for characterizing a communication link.

Turning to FIG. 5, a flow diagram depicting an embodiment of a method for characterizing a communication link is depicted. The method, which may be applied to various receiver circuits, e.g., receiver circuit 100 as depicted in FIG. 1, begins in block 501.

The method includes activating a training mode for a receiver circuit coupled to a communication channel (block 502). The communication channel may, in some cases, be coupled between a particular device and a different device that includes the receiver circuit.

The method further includes receiving, by the receiver circuit via the communication channel, a test signal (block 503). In various embodiments, the test signal may include a plurality of data symbols, and may be formatted according to a particular communication protocol. In some embodiments, the test signal may be a pseudorandom binary sequence (PRBS) such as PRBS 11, or any other suitable training sequence.

The method also includes recovering, by the receiver circuit, a plurality of recovered symbols and a plurality of samples from the test signal (block 504). In some embodiments, recovering the plurality of samples includes sampling, by the receiver circuit, the test signal at a particular time to generate a particular sample, and comparing, by the receiver circuit, the particular sample to a particular threshold voltage.

The method further includes determining, by the receiver circuit, in response to determining that a particular condition occurred in the plurality of recovered symbols, a conditional probability distribution of the test signal. In various embodiments, determining the conditional probability distribution of the test signal can include counting, in response to determining that the particular condition occurred in the plurality of recovered symbols, a number of occurrences of a particular logical value in the plurality of samples. In some embodiments, the method includes determining the conditional probability distribution of the test signal using the number of occurrences of the particular logical value in the plurality of samples. (block 505). In some embodiments, determining the conditional probability distribution includes comparing, by the receiver circuit, the particular sample to a plurality of threshold voltages to generate a corresponding plurality of recovered symbols. Alternatively, or additionally, determining the conditional probability distribution includes sampling, by the receiver circuit, the test signal at a plurality of time points to generate a plurality of samples. In various embodiments, the plurality of time points may be centered around the particular time, and span a period of time less than a duration of a data eye of the test signal at the particular time.

The method also includes adjusting at least one parameter of the receiver circuit using a statistical measurement of the conditional probability distribution of the test signal (block 506). In some embodiments, adjusting the at least one parameter includes determining, by the receiver circuit, a statistical mean of the conditional probability distribution, and adjusting the at least one operating parameter using the statistical mean. In various embodiments, the method may further include halting the training mode in response to completing an adjustment to the at least one operating parameter of the receiver circuit.

In some embodiments, the method may include equalizing, by a decision-feedback equalization circuit using the plurality of recovered symbols, the test signal. In such cases, adjusting the at least one parameter includes adjusting, by the receiver circuit, at least one coefficient used by the decision-feedback equalization circuit. Alternatively, or additionally, the method may include equalizing, by a continuous time linear equalization circuit, the test signal. The method concludes in block 507.

Figure 6:
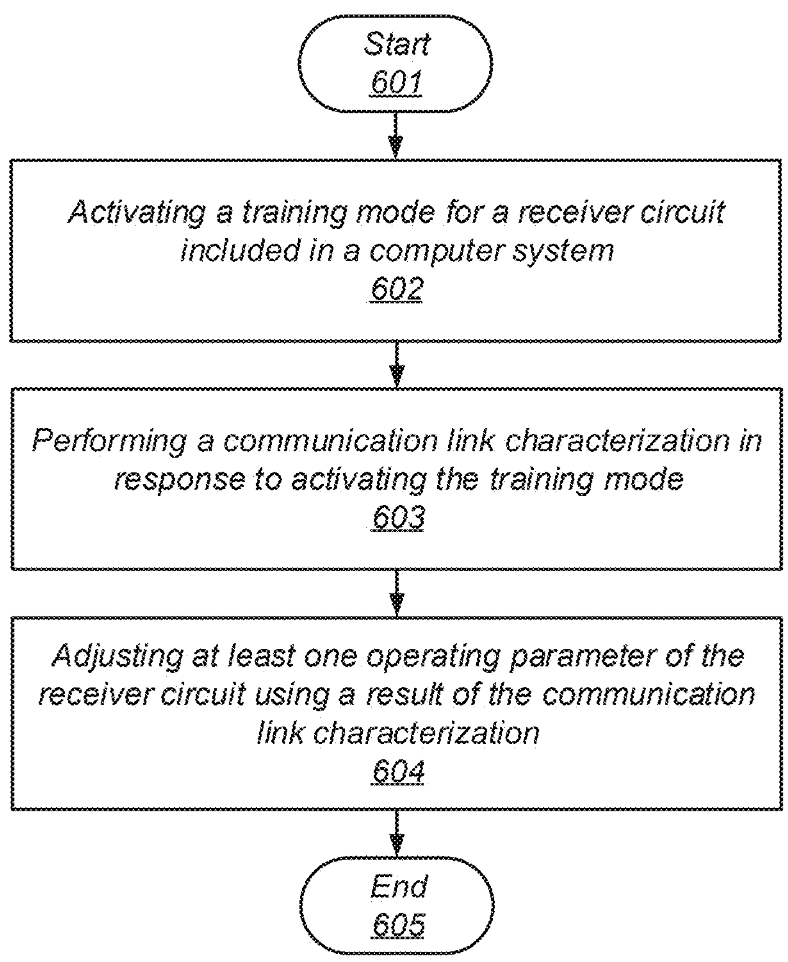
FIG. 6 is a flow diagram depicting an embodiment of a method for training a receiver circuit.

Turning to FIG. 6, a flow diagram depicting an embodiment of a method for training a receiver circuit is illustrated. The method, which may be applied to various receiver circuits, e.g., receiver circuit 100 as depicted in FIG. 1, begins in block 601.

The method includes activating a training mode for a receiver circuit included in a computer system (block 602). In various embodiments, the method includes activating the training mode in response to a reset operation or a boot operation of the computer system. In other embodiments, the method includes activating the training mode at periodic intervals, or in response to the computer system exiting a power-down mode or sleep mode in which the receiver circuit is not used.

The method also includes performing a communication link characterization in response to activating the training mode (block 603). In some embodiments, the communication link may be a serial communication link that includes one or more wires used to propagate signals from a transmitter circuit to the receiver circuit. In various embodiments, the communication link characterization can include all or some of the operations described above in regard to the embodiment of the method depicted in the flow diagram of FIG. 5.

The method further includes adjusting at least one operating parameter of the receiver circuit using a result of the communication link characterization (block 604). As described above, the receiver circuit may employ equalization, i.e., decision-feedback equalization. In such cases, adjusting the at least one operating parameter may include changing one or more coefficients used in the decision-feedback equalization circuit. In other cases, adjusting the at least one operating parameter may include adjusting a sampling point, adjusting a reference voltage used in sampling the received signal, or any other suitable operating parameter of the receiver circuit or any of its sub-circuits. The method concludes in block 605.

Figure 7:
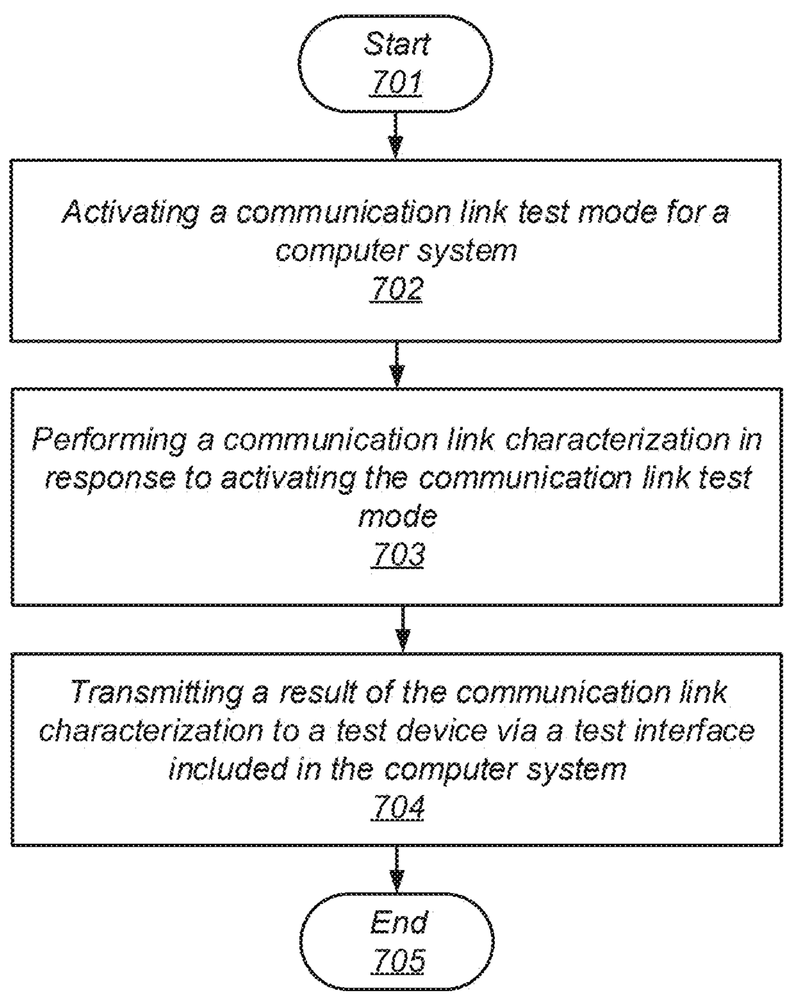
FIG. 7 is a flow diagram depicting an embodiment of a method for performing a factory test of a communication link.

Turning to FIG. 7, a flow diagram depicting an embodiment of a method for performing a factory test of a communication link is illustrated. The method, which may be applied to various communication links or channels, e.g., communication channel 106 as depicted in FIG. 1, begins in block 701.

The method includes activating a communication link test mode for a computer system (block 702). In various embodiments, the method includes activating the communication link test mode in response to completing assembly of the computer system. In other embodiments, the method includes activating the communication link test mode in response to receiving a remote diagnostic signal.

The method further includes performing a communication link characterization in response to activating the communication link test mode (block 703). In various embodiments, the communication link characterization may include one or more of the operations as described above in regard to FIG. 5. In some embodiments, performing the communication link characterization may include a first device sending test data via the communication link to a second device that includes a receiver circuit configured to perform the functions of receiver circuit 100 as depicted in FIG. 1.

The method also includes transmitting a result of the communication link characterization to a test device via a test interface included in the computer system (block 704). In some embodiments, the method may further include rejecting or identifying the computer system for re-work using the result. In some embodiments, the test device may include an external computer system coupled to the computer system under test via a network connection. The method concludes in block 705.

Figure 8:
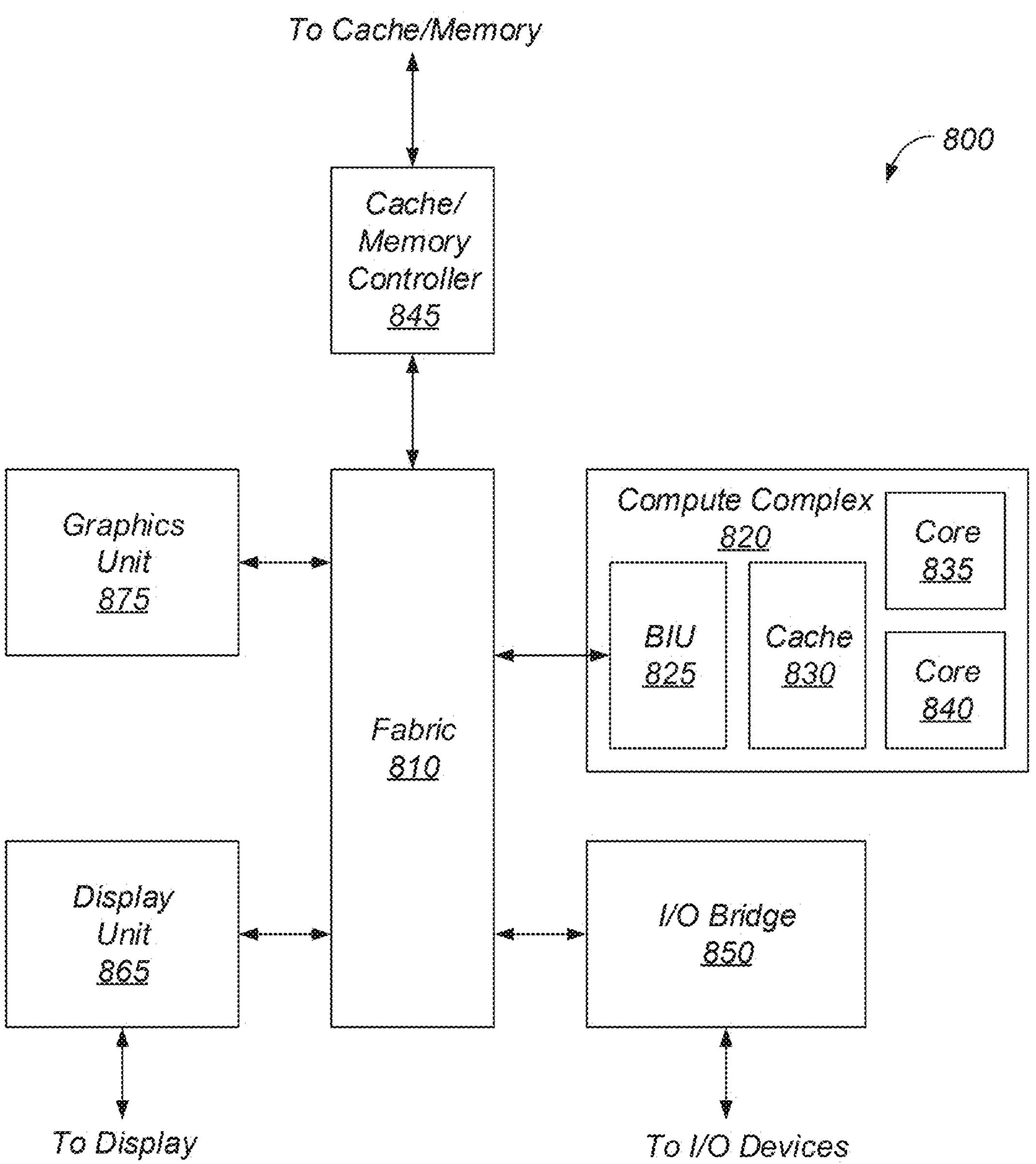
FIG. 8 is a block diagram of an embodiment of a device that may include receiver circuits.

Referring now to FIG. 8, a block diagram illustrating an example embodiment of a device is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820, input/output (I/O) bridge 850, cache/memory controller 845, graphics unit 875, and display unit 865. In some embodiments, device 800 may include other components (not shown) in addition to, or in place of, the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol, and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores, and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800, may be configured to maintain coherency between various caches of device 800. BIU 825 may be configured to manage communication between compute complex 820 and other elements of device 800. Processor cores, such as cores 835 and 840, may be configured to execute instructions of a particular instruction set architecture (ISA) which may include operating system instructions and user application instructions. These instructions may be stored in a computer readable medium such as a memory coupled to cache memory controller 845 as discussed below.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Cache/memory controller 845 may be configured to manage transfer of data between fabric 810 and one or more caches and memories. For example, cache/memory controller 845 may be coupled to an L3 cache, which may, in turn, be coupled to a system memory. In other embodiments, cache/memory controller 845 may be directly coupled to a memory. In some embodiments, cache/memory controller 845 may include one or more internal caches. Memory coupled to cache/memory controller 845 may be any type of volatile memory, such as dynamic random access memory (DRAM), synchronous DRAM (SDRAM), double data rate (DDR, DDR2, DDR3, etc.) SDRAM (including mobile versions of SDRAMs such as mDDR3, etc., and/or low power versions of SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to cache/memory controller 845 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 820 to cause the computing device to perform functionality described herein.

Graphics unit 875 may include one or more processors, e.g., one or more graphics processing units (GPUs). Graphics unit 875 may receive graphics-oriented instructions, such as OPENGL®, Metal®, or DIRECT3D® instructions, for example. Graphics unit 875 may execute specialized GPU instructions or perform other operations based on the received graphics-oriented instructions. Graphics unit 875 may generally be configured to process large blocks of data in parallel, and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 800 with connectivity to various types of other devices and networks.

Figure 9:
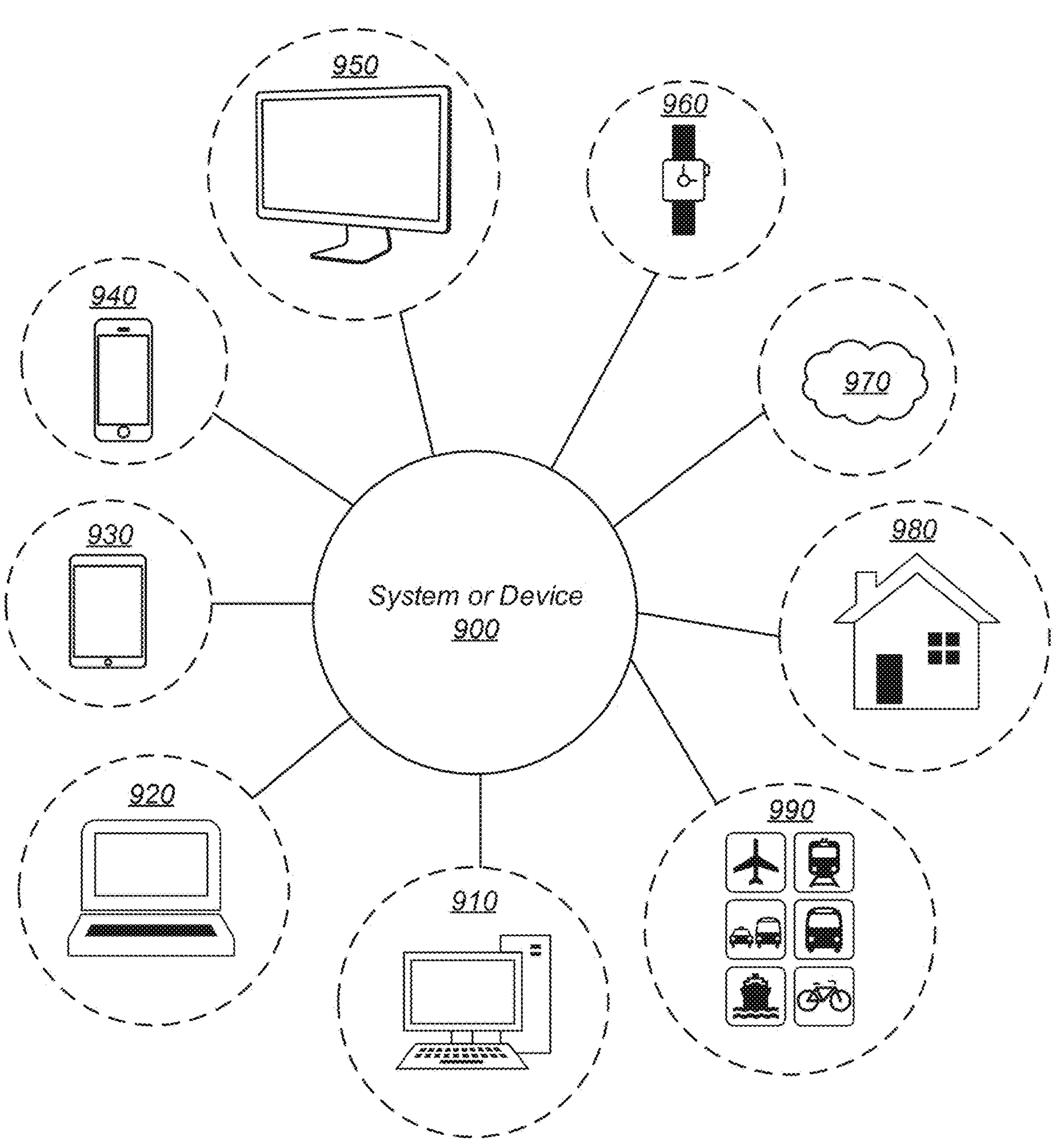
FIG. 9 is a block diagram of various embodiments of computer systems that may include receiver circuits.

Turning now to FIG. 9, various types of systems that may include any of the circuits, devices, or systems discussed above are illustrated. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as design simulation, design synthesis, circuit fabrication, etc.

Figure 10:
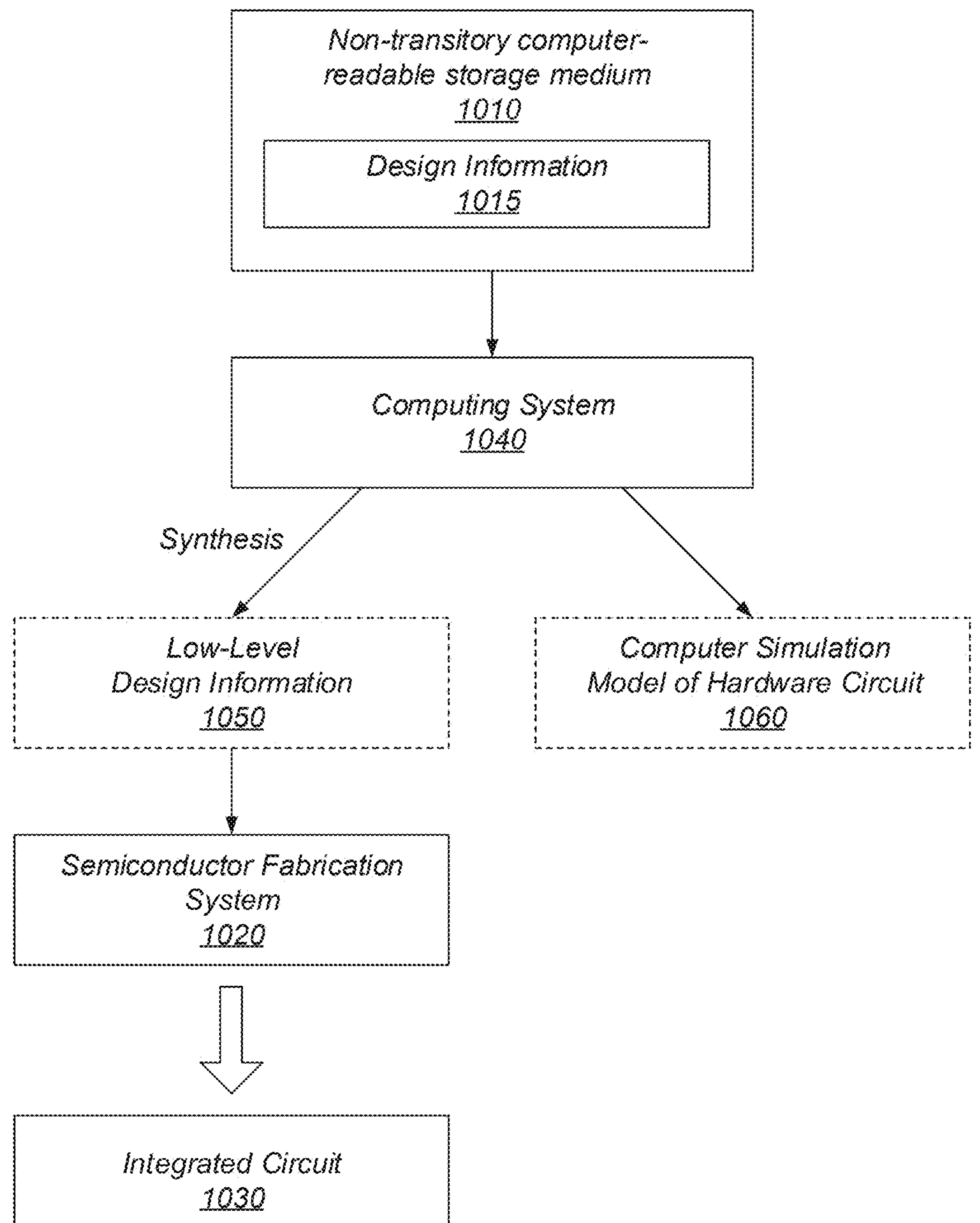
FIG. 10 illustrates an example of a non-transitory computer-readable storage medium that stores circuit design information.

FIG. 10 is a block diagram illustrating an example of a non-transitory computer-readable storage medium that stores design information 1015, according to some embodiments. In the illustrated embodiment, computing system 1040 is configured to process design information 1015. This may include executing instructions included in design information 1015, interpreting instructions included in design information 1015, compiling, transforming, or otherwise updating design information 1015, etc. Therefore, design information 1015 controls computing system 1040 (e.g., by programming computing system 1040) to perform various operations discussed below, in some embodiments.

In the illustrated example, computing system 1040 processes design information 1015 to generate both computer simulation model of hardware circuit 1060 and low-level design information 1050. In other embodiments, computing system 1040 may generate only one of these outputs, may generate other outputs based on design information 1015, or both. Regarding computer simulation model of hardware circuit 1060, computing system 1040 may execute instructions of a hardware description language that includes register transfer level (RTL) code, behavioral code, structural code, or some combination thereof. The simulation model may perform the functionality specified by design information 1015, facilitate verification of the functional correctness of the hardware design, generate power consumption estimates, generate timing estimates, etc.

In the illustrated example, computing system 1040 also processes design information 1015 to generate low-level design information 1050 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on low-level design information 1050 (potentially among other inputs), semiconductor fabrication system 1020 is configured to fabricate integrated circuit 1030 (which may correspond to functionality of the computer simulation model of hardware circuit 1060). Note that computing system 1040 may generate different simulation models based on design information at various levels of description, including low-level design information 1050, design information 1015, and so on. The data representing low-level design information 1050 and computer simulation model of hardware circuit 1060 may be stored on non-transitory computer-readable storage medium 1010, or on one or more other media.

In some embodiments, low-level design information 1050 controls (e.g., programs) semiconductor fabrication system 1020 to fabricate integrated circuit 1030. Thus, when processed by the fabrication system, the design information may program the fabrication system to fabricate a circuit that includes various circuitry disclosed herein.

Non-transitory computer-readable storage medium 1010 may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash memory, magnetic media, e.g., a hard drive, or optical storage; registers, or other similar types of memory elements, etc. Non-transitory computer-readable storage medium 1010 may include other types of non-transitory memory as well, or combinations thereof. Accordingly, non-transitory computer-readable storage medium 1010 may include two or more memory media, which may reside in different locations—for example, in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 1040, semiconductor fabrication system 1020, or both. In some embodiments, design information 1015 may also include one or more cell libraries that specify the synthesis, layout, or both of integrated circuit 1030. In some embodiments, design information 1015 is specified in whole, or in part, in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 and computer simulation model of hardware circuit 1060 are configured to operate according to a circuit design specified by design information 1015, which may include performing any of the functionality described herein. For example, integrated circuit 1030 may include any of various elements shown in FIGS. 1-4. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model does not imply that the instructions must be executed in order for the element to be met, but rather, specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by design information 1015. The different circuit implementations may affect the performance, area, power consumption, etc. of a given design (potentially with tradeoffs between different design goals), but the logical function does not vary among the different circuit implementations of the same circuit design.

In some embodiments, the instructions included in design information 1015 provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information included in low-level design information 1050. Low-level design information 1050 may program semiconductor fabrication system 1020 to fabricate integrated circuit 1030.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third," when applied to a feature, do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors, or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, a circuit, or a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S. C. § 112(f) for that claim element. Should Applicant wish to invoke Section 112(f) during prosecution of a United States patent application based on this disclosure, it will recite claim elements using the "means for"[performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), a functional unit, a memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as a structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits, or portions thereof, may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:

an equalizer circuit configured to:

receive an input signal via a communication channel; and generate an equalized signal using the input signal and a plurality of recovered symbols;

a recovery circuit configured to generate the plurality of recovered symbols and a recovered clock signal using the equalized signal;

a slicer circuit configured to generate a plurality of samples using the equalized signal;

a deserializer circuit configured to generate recovered data using the plurality of recovered symbols and the plurality of samples; and a control circuit configured to:

count a number of occurrences of a particular logic value in the plurality of samples in response to a detection of a particular pattern in the plurality of recovered symbols;

determine, using the number of occurrences of the particular logic value, a conditional probability distribution of the equalized signal; and adjust at least one operating parameter of the equalizer circuit based on a statistical measurement of the conditional probability distribution of the equalized signal.

2. The apparatus of claim 1, wherein to generate the plurality of samples, the slicer circuit is configured to:

sample the equalized signal and the input signal at a particular time point to generate a particular sample of the plurality of samples; and compare the particular sample with a threshold voltage.

3. The apparatus of claim 2, wherein the control circuit is further configured to vary a value of the threshold voltage through a plurality of values, and wherein the slicer circuit is further configured to compare the particular sample to the plurality of values to generate a corresponding plurality of results.

4. The apparatus of claim 2, wherein the control circuit is further configured to vary a value of the particular time point through a plurality of time points, and wherein the slicer circuit is further configured to sample the combination of the equalized signal and the input signal at the plurality of time points to generate a corresponding plurality of results.

5. The apparatus of claim 1, wherein the control circuit is further configured to:

determine a statistical mean of the conditional probability distribution of the equalized signal; and adjust the at least one operating parameter using the statistical mean.

6. A method, comprising:

activating a training mode of a receiver circuit coupled to a communication channel;

receiving, by the receiver circuit via the communication channel, a test signal;

recovering, by the receiver circuit, a plurality of recovered symbols and a plurality of samples from the test signal;

determining, by the receiver circuit, in response to determining that a particular condition occurred in the plurality of recovered symbols, a conditional probability distribution of the test signal using a number of a particular logic value in the plurality of samples; and adjusting at least one operating parameter of the receiver circuit using a statistical measurement of the conditional probability distribution of the test signal.

7. The method of claim 6, wherein recovering the plurality of samples from the test signal includes:

sampling, by the receiver circuit, the test signal at a particular time to generate a particular sample; and comparing, by the receiver circuit, the particular sample to a particular threshold voltage.

8. The method of claim 7, wherein determining the conditional probability distribution of the test signal includes comparing, by the receiver circuit, the particular sample to a plurality of threshold values to generate a corresponding plurality of recovered symbols.

9. The method of claim 7, wherein determining the conditional probability distribution of the test signal includes sampling, by the receiver circuit, the test signal at a plurality of time points to generate a corresponding plurality of samples.

10. The method of claim 6, further comprising:

determining, by the receiver circuit, a statistical mean of the conditional probability distribution of the test signal; and adjusting the at least one operating parameter using the statistical mean.

11. The method of claim 6, further comprising equalizing, by a decision-feedback equalization circuit of the receiver circuit using the plurality of recovered symbols, the test signal, and wherein adjusting the at least one operating parameter includes adjusting, by the receiver circuit, at least one coefficient of the decision-feedback equalization circuit.

12. The method of claim 6, further comprising halting the training mode in response to completing an adjustment to the at least one operating parameter of the receiver circuit.

13. A system, comprising:

a first device coupled to a communication channel, wherein the first device is configured, in response to activation of a training mode, to transmit training data via the communication channel; and a second device coupled to the communication channel, wherein the second device includes a receiver circuit configured to:

receive an input signal via the communication channel, wherein the input signal includes the training data;

sample the training data included in the input signal to generate recovered symbols;

determine a conditional probability distribution of the training data included in the input signal in response to a determination that a particular pattern has occurred in the recovered data; and adjust at least one operating parameter of the receiver circuit based on a statistical measurement of the conditional probability distribution.

14. The system of claim 13, wherein to sample the input signal, the receiver circuit is further configured to:

sample the input signal at a particular time to generate a particular sample; and compare the particular sample to a particular threshold voltage.

15. The system of claim 14, wherein to determine the conditional probability distribution of the input signal, the receiver circuit is further configured to compare the particular sample to a plurality of threshold values to generate a corresponding plurality of recovered bits.

16. The system of claim 14, wherein to determine the conditional probability distribution of the input signal, the receiver circuit is further configured to sample the input signal at a plurality of time points to generate a corresponding plurality of samples.

17. The system of claim 13, wherein the receiver circuit is further configured to:

determine a statistical mean of the conditional probability distribution of the input signal; and adjust the at least one operating parameter using the statistical mean.

18. The system of claim 13, wherein the receiver circuit includes a decision-feedback equalization circuit configured to generate an equalization signal using the recovered symbols, wherein the receiver circuit is further configured to sample a combination of the input signal and the equalization signal, and wherein to adjust the at least one operating parameter, the receiver circuit is further configured to adjust at least one coefficient of the decision-feedback equalization circuit.

19. The system of claim 13, wherein the second device is configured to halt the training mode in response to a completion of an adjustment of the at least one operating parameter.

* * * * *